United States Patent
Phillips, III et al.

(10) Patent No.: US 8,382,293 B2
(45) Date of Patent: Feb. 26, 2013

(54) LIGHT SOURCE MODULE

(75) Inventors: William E. Phillips, III, Cincinnati, OH (US); Jacob Moskovich, Cincinnati, OH (US); Zhisheng Yun, Woodbury, MI (US)

(73) Assignee: 3M Innovative Properties Company, St. Paul, MN (US)

( * ) Notice: Subject to any disclaimer, the term of this patent is extended or adjusted under 35 U.S.C. 154(b) by 327 days.

(21) Appl. No.: 12/990,801

(22) PCT Filed: Apr. 30, 2009

(86) PCT No.: PCT/US2009/042349
§ 371 (c)(1),
(2), (4) Date: Nov. 3, 2010

(87) PCT Pub. No.: WO2009/137331
PCT Pub. Date: Nov. 12, 2009

(65) Prior Publication Data
US 2011/0058350 A1     Mar. 10, 2011

Related U.S. Application Data

(60) Provisional application No. 61/050,424, filed on May 5, 2008.

(51) Int. Cl.
*G03B 21/14*     (2006.01)
(52) U.S. Cl. .......................... 353/102; 353/98; 362/561
(58) Field of Classification Search .................... 353/98, 353/99, 38; 385/133, 901; 362/551, 553, 362/555, 559, 561, 227, 230, 231, 234
See application file for complete search history.

(56) References Cited

U.S. PATENT DOCUMENTS

| | | | |
|---|---|---|---|
| 5,532,763 A | 7/1996 | Janssen et al. | |
| 5,625,738 A | 4/1997 | Magarill | |
| 5,829,858 A * | 11/1998 | Levis et al. | 353/122 |
| 6,179,426 B1 | 1/2001 | Rodriguez, Jr. et al. | |
| 6,343,862 B1 * | 2/2002 | Sawai et al. | 353/1 |
| 6,394,609 B1 | 5/2002 | Rodriguez, Jr. et al. | |
| 6,394,610 B2 | 5/2002 | Rodriguez, Jr. | |
| 6,461,000 B1 | 10/2002 | Magarill | |
| 6,485,146 B2 | 11/2002 | Rodriguez, Jr. | |
| 6,520,646 B2 | 2/2003 | Rodriguez, Jr. | |
| 6,530,664 B2 | 3/2003 | Vanderwerf et al. | |
| 6,552,922 B2 | 4/2003 | Magarill | |
| 6,561,656 B1 * | 5/2003 | Kojima et al. | 353/98 |
| 6,568,814 B2 | 5/2003 | Rodriguez, Jr. et al. | |
| 6,575,580 B2 * | 6/2003 | Okamori et al. | 353/98 |

(Continued)

FOREIGN PATENT DOCUMENTS

| | | |
|---|---|---|
| WO | WO 00/52526 | 9/2000 |
| WO | WO 02/086618 | 10/2002 |

(Continued)

*Primary Examiner* — William C Dowling
(74) *Attorney, Agent, or Firm* — Kristofor L. Storvick (57) ABSTRACT

A light source module is disclosed. The light source module includes an emitter having a light emitting surface, a solid integrating optic aligned to accept light emitted from the emitter at an entrance face and deliver light to an exit face, and a lens aligned to receive light from the exit face. The lens has a substantially hemispherical portion having a radius of curvature and the exit face of the solid integrating optic has an exit face diagonal. The ratio of the radius of curvature to the exit face diagonal is greater than 0.7. The solid integrating optic and the lens each have an index of refraction, and the ratio of the lens index of refraction to the solid integrating optic index of refraction is greater than unity.

20 Claims, 4 Drawing Sheets

U.S. PATENT DOCUMENTS

| | | | |
|---|---|---|---|
| 6,604,829 B2 | 8/2003 | Rodriguez, Jr. | |
| 6,726,332 B2 | 4/2004 | Cannon et al. | |
| 7,123,426 B2 | 10/2006 | Lu et al. | |
| 7,126,767 B2 | 10/2006 | Lu | |
| 7,192,795 B2 | 3/2007 | Boardman et al. | |
| 7,246,923 B2 | 7/2007 | Conner | |
| 7,271,964 B2 | 9/2007 | Rodriguez, Jr. et al. | |
| 7,280,723 B2 * | 10/2007 | Tabor | 385/39 |
| 7,322,700 B2 | 1/2008 | Miyagaki et al. | |
| 7,354,162 B2 | 4/2008 | Akiyama | |
| 7,717,599 B2 | 5/2010 | Grace et al. | |
| 2002/0024636 A1 * | 2/2002 | Okamori et al. | 353/31 |
| 2004/0212789 A1 * | 10/2004 | Cha | 353/98 |
| 2005/0122484 A1 | 6/2005 | Rodriguez, Jr. et al. | |
| 2006/0007402 A1 * | 1/2006 | Jeon | 353/31 |
| 2008/0012964 A1 | 1/2008 | Miki et al. | |
| 2009/0116214 A1 | 5/2009 | Phillips, III et al. | |

FOREIGN PATENT DOCUMENTS

| | | |
|---|---|---|
| WO | WO/02/089474 | 11/2002 |
| WO | WO 2004/062278 | 7/2004 |
| WO | WO 2005/057267 | 6/2005 |
| WO | WO 2005/078496 | 8/2005 |

* cited by examiner

LIGHT SOURCE MODULE

CROSS REFERENCE TO RELATED APPLICATIONS

This application is a national stage filing under 35 U.S.C. 371 of PCT/US2009/042349, filed Apr. 30, 2009, which claims priority to U.S. Provisional Application No. 61/050,424, filed May 5, 2008, the disclosure of which is incorporated by reference in its/their entirety herein.

SUMMARY

In one aspect, the present disclosure provides a light source module. The light source module includes an emitter having a light emitting surface, a solid integrating optic aligned to accept light emitted from the emitter at an entrance face and deliver light to an exit face, and a lens aligned to receive light from the exit face. The lens has a substantially hemispherical portion having a radius of curvature and the exit face of the solid integrating optic has an exit face diagonal. The ratio of the radius of curvature to the exit face diagonal is greater than 0.7. The solid integrating optic and the lens each have an index of refraction, and the ratio of the lens index of refraction to the solid integrating optic index of refraction is greater than unity.

In another aspect, the present disclosure provides an illumination system. The illumination system includes at least one light source module. The light source module includes an emitter having a light emitting surface, a solid integrating optic aligned to accept light emitted from the emitter at an entrance face and deliver light to an exit face, and a lens aligned to receive light from the exit face. The lens has a substantially hemispherical portion having a radius of curvature and the exit face of the solid integrating optic has an exit face diagonal. The ratio of the radius of curvature to the exit face diagonal is greater than 0.7. The solid integrating optic and the lens each have an index of refraction, and the ratio of the lens index of refraction to the solid integrating optic index of refraction is greater than unity. The illumination system also includes optical elements arranged to deliver light from the at least one light source module to an illumination target.

In yet another aspect, the present disclosure provides a projection system. The projection system includes at least one light source module and an imager. The light source module includes an emitter having a light emitting surface, a solid integrating optic aligned to accept light emitted from the emitter at an entrance face and deliver light to an exit face, and a lens aligned to receive light from the exit face. The lens has a substantially hemispherical portion having a radius of curvature and the exit face of the solid integrating optic has an exit face diagonal. The ratio of the radius of curvature to the exit face diagonal is greater than 0.7. The solid integrating optic and the lens each have an index of refraction, and the ratio of the lens index of refraction to the solid integrating optic index of refraction is greater than unity. The projection system also includes optical elements arranged to deliver the illumination light from the at least one light source module to the imager and projection lens elements arranged to receive an image light from the imager and project the image light.

These and other aspects of the present disclosure will be apparent from the detailed description below. In no event, however, should the above summaries be construed as limitations on the claimed subject matter.

BRIEF DESCRIPTION OF THE DRAWINGS

The present disclosure is described with respect to the appended Figures, wherein.

DETAILED DESCRIPTION

Light source modules are widely used in illumination systems which have a variety of applications, including projection displays, backlights for liquid crystal displays and others. Projection systems can include a source of light, illumination optics, an imager, projection optics and a projection screen. The illumination optics collect light from a light source and direct it to one or more imagers in a predetermined manner. The imagers, or image-forming devices, are controlled by an electronically conditioned and processed digital signal and produce an image corresponding to the signal. Projection optics then magnify the image and project it onto the projection screen. White light sources, such as arc lamps, in conjunction with color wheels have been and still are commonly used as light sources for projection display systems. Recently, light emitting diodes (LEDs) were introduced as an alternative due to their longer lifetime, higher efficiency and superior thermal characteristics.

Recent advances in solid state lighting, optics, and display elements are allowing the creation of extremely small, full-color projectors. In order to make these color projectors small enough to be incorporated into, e.g., a portable device such as a mobile phone, it is necessary to explore very efficient and compact means of combining colors. There are two predominant methods of creating color projection with a single imager. The first method, known as "Color-Sequential," involves overlaying light from, e.g., individual red, green and blue light sources and delivering light of these colors onto a monochrome imager in a specific time-sequential fashion. The second method, known as "Color-Filtering," entails delivering light of a white light source onto an imager with red/green/blue color filters. Light source modules of the present disclosure may be suitable for use in projection systems of either color-sequential or color-filter types.

Figure 1:
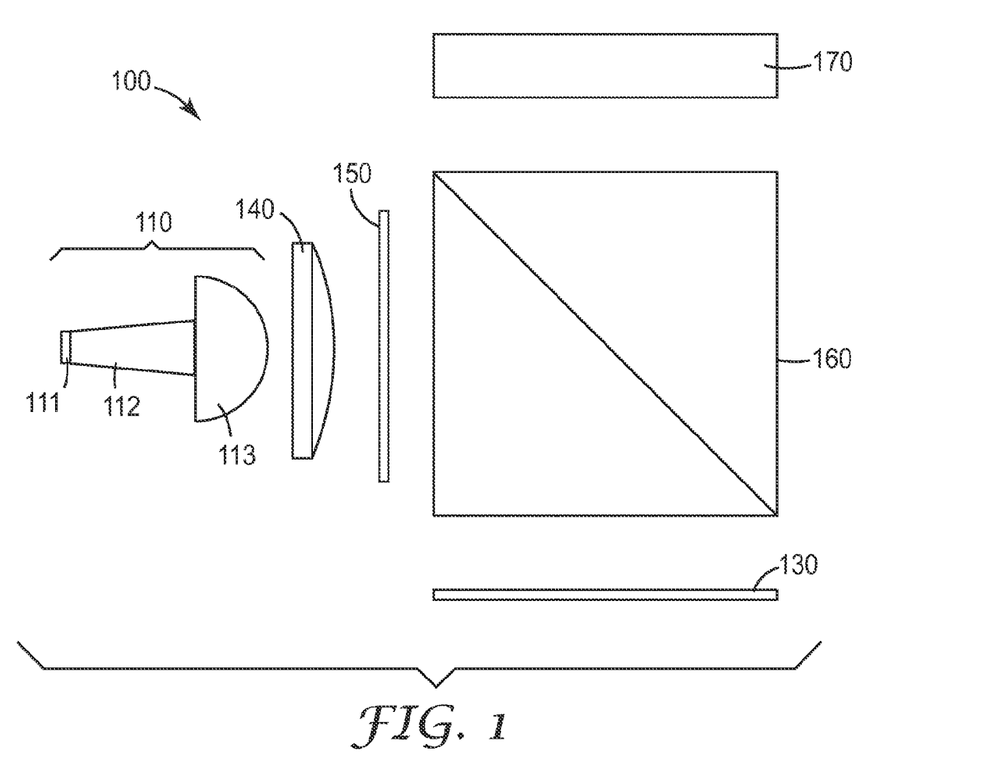
FIG. 1 is a schematic cross-sectional view of a projection system.

FIG. 1 is a schematic cross-sectional view of one embodiment of a projection system 100. The projection system 100 can be used for projecting still or moving images onto a surface, such as a projection screen. The projection system 100 includes at least one light source module 110 and an illumination target 130. The illumination target 130 can be an imager, such as a liquid crystal on silicon (LCOS) or a digital micro-mirror device (DMD). Illumination target 130 may be used in a reflective mode, as shown, for example, in the embodiment illustrated in FIG. 1, or it may be used in a transmissive mode, for example, in the case of a transmissive liquid crystal display imager, in which case the arrangement of system 100 can vary from that shown in FIG. 1. Regardless of mode of operation of the illumination target 130, the projection system 100 can generally include a subsystem of optical elements disposed between the light source module 110 and the illumination target, as described herein. The subsystem of optical elements can, in part, deliver illumination light from the light source module 110 to the illumination target 130. Furthermore the elements may otherwise affect or make the light suitable for use with the illumination target. Together, the light source module 110 or modules and any optical elements that deliver illumination light to the illumination target 130 may be considered to be included in an illumination system. Part or all of the subsystem of optical elements may also transmit, reflect, transport, or otherwise handle light after incidence upon the illumination target 130, as well as before such incidence.

As illustrated in FIG. 1, the subsystem of optical elements disposed between the light source module 110 and the illumination target 130 can include one or more lenses 140, one or more filters 150, which can be, for example, an ultraviolet (UV) filter or a reflective polarizer, a light directing element 160, and any other suitable optical elements. The types of optical elements, if present, may generally depend on the nature of the illumination target and the type of projection system 100 of which the elements are a part. If, for example, the system 100 is part of a projection system in which the illumination target 130 is an LCOS imager, then light directing element 160 may be a polarizing beamsplitter, including, for example, a multi-layer polarizing interference stack. In general, the representation of light directing element 160 in FIG. 1 is schematic, and an actual light directing element as used in a projection system 100 may vary considerably from that depicted in FIG. 1. For example, rather than taking the form of a cube with a beamsplitting hypotenuse, a beamsplitter may be formed on the surface of a plate or on a pellicle membrane, or may generally take any other suitable physical form. If, in another example, the illumination target 130 in projection system 100 is a DMD imager, then light directing element 160 may be a total internal reflection prism that includes an airgap, as described in, for example, U.S. Pat. No. 5,552,922 (Magarill), U.S. Pat. No. 6,461,000 (Magarill), and U.S. Pat. No. 6,726,332 (Cannon and Oehler), and U.S. Patent Application Ser. No. 61/017,987 (Magarill). If, in a further example, the illumination target 130 in projection system 100 is a transmissive LCD imager, then light directing element 160 may not be present.

Projection system 100 can also include projection lens 170 that may receive image light after an image has been imposed on the light, e.g., by an imager, and project the light, for example, onto a projection screen (not shown). The projection lens 170 may include any suitable components. Some of the optical elements of the illumination system disposed between the light source module 110 and the illumination target 130 may also be disposed between the illumination target and the projection lens 170, and further, such optical elements might be considered part of a projection lens system in conjunction with projection lens 170, depending on the design of projection system 100.

Not only may optical elements serve in multiple systems, such as an illumination system and a projection lens system, it is possible for optical elements to serve multiple optical functions. For example, a light directing element 160 may include non-planar faces with optical power such that the light directing element provides a refractive function as well as a light directing function.

Returning to the light origination side of the projection system 100 of FIG. 1, the light source module 110 can include an emitter 111, a solid integrating optic 112, and a lens 113.

Figure 2:
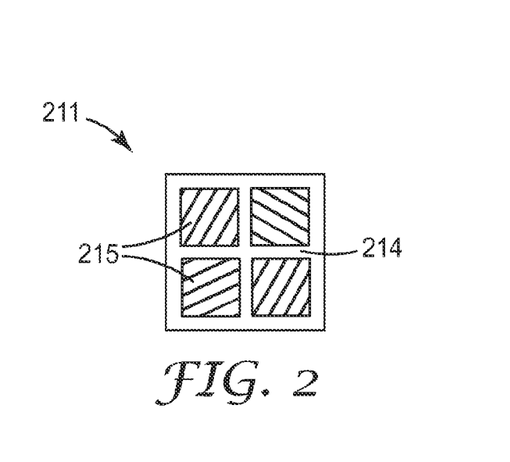
FIG. 2 is a schematic front view of an emitter.

FIG. 2 is a schematic front view of an emitter 211 that can be used in the light source module 110 of projection system 100 of FIG. 1 or any other like light source module, showing a light emitting surface 214. The light emitting surface 214 can include a single light emitting area, or it can include an array having a plurality of light emitting areas 215. As shown in FIG. 2, one embodiment of the light emitting surface 214 includes an array having four light emitting areas 215. Depending on the application, the light emitting areas of an array may be similar or dissimilar. In some embodiments, all the areas emit essentially the same color of light, for example, white light. In other embodiments, the light emitting areas emit three or more colors, for example, red, green, and blue, as suggested by cross-hatching in FIG. 2. Any suitable technology may be used for light emitters of the present disclosure. Light emitting diodes and other solid state devices may be particularly suitable.

Figure 3:
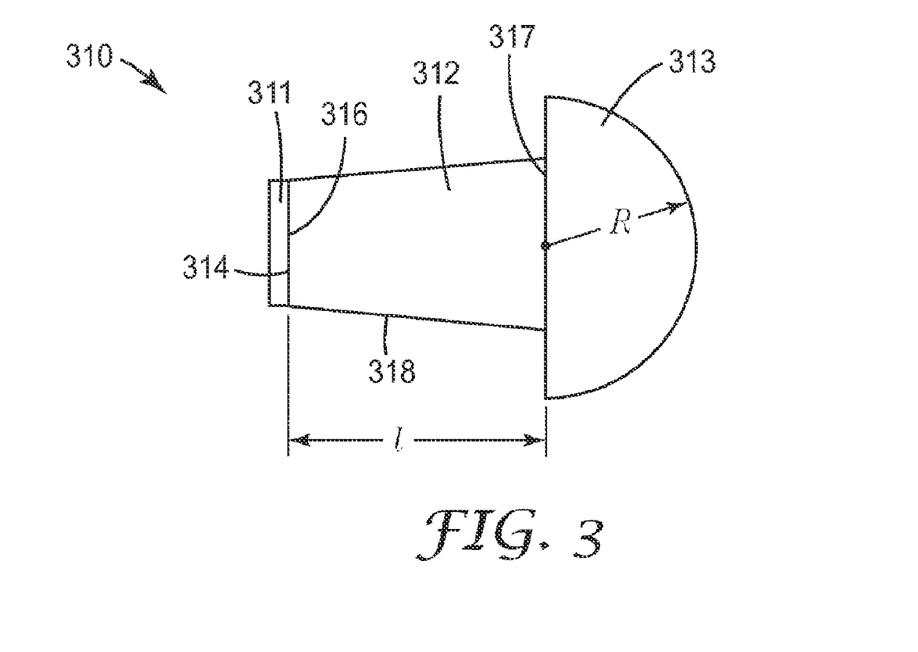
FIG. 3 is a schematic cross-sectional view of a light source module.

FIG. 3 is a schematic cross-sectional view of a light source module 310 that can be used in the projection system 100 of FIG. 1 or any other compatible projection or illumination system. The light source module 310 includes a solid integrating optic 312 that has an entrance face 316 and an exit face 317. Entrance face 316 and exit face 317 are typically rectangular, though in general they may take any suitable form. Entrance face 316 can be aligned to accept light emitted by light emitting surface 314 of emitter 311. The dimensions and shape of the entrance face 316 can be chosen to substantially match the dimensions and shape of the light emitting surface 314. This match in dimensions and shapes can be three dimensional, if, e.g., the light emitting surface 314 is not planar, or the entrance face 316 and light emitting surface may match in fewer than three dimensions. In some embodiments, the entrance face 316 is planar. The entrance face 316 and the light emitting surface 314 may be bonded or coupled with a suitable adhesive or other material. A filter, such as a reflective polarizer as described herein, may be located between the light emitting surface 314 and the entrance face 316, and the combination of emitter, filter, and solid integrating optic may be bonded. One type of material that may be used to optically couple light emitting surface 314 and entrance face 316 is referred to as an encapsulant, which can provide optical, thermal, mechanical, or other benefits when used in conjunction with emitters, particularly, LEDs. Encapsulants are described, for example, in U.S. Pat. No. 7,192,795 (Boardman et al.).

Figure 4A:
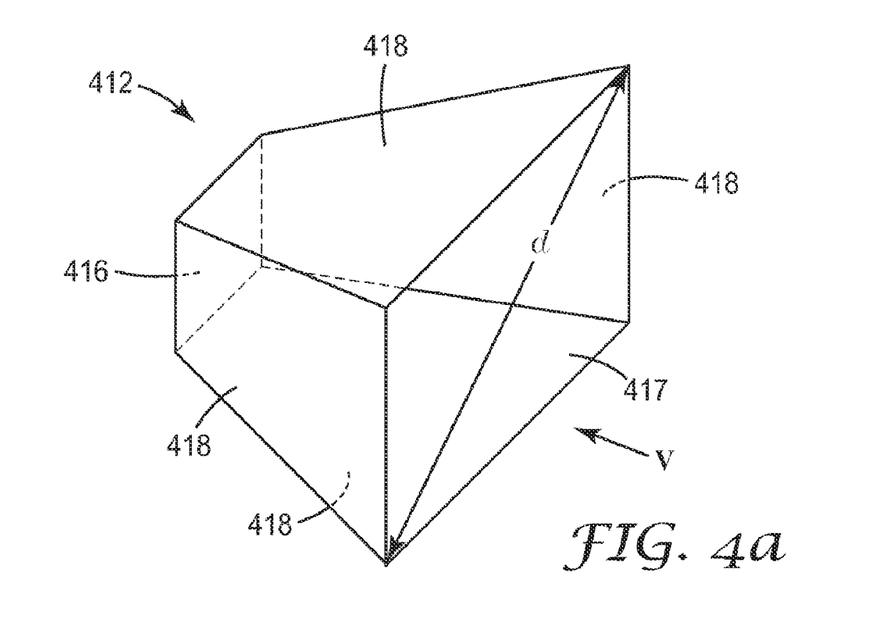
FIG. 4a is a schematic isometric view of a solid integrating optic.
Figure 4B:
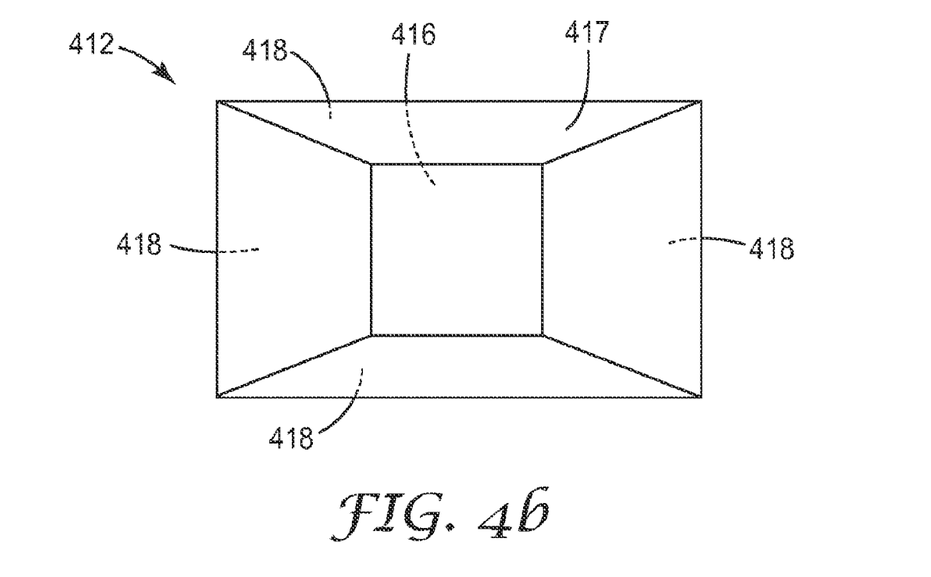
FIG. 4b is a schematic front view of a solid integrating optic.

The exit face 317, which may or may not be planar, can have a shape corresponding to that of an illumination target such as target 130 of FIG. 1. For example, if the illumination target is an imager for a video projector, the imager and exit face 317 may both be rectangular with an aspect ratio of 4:3, 16:9, or any other suitable shape. Matching the shape of the exit face 317 with that of an imager may eliminate a need for anamorphic optics that might otherwise be used in a projection system. FIG. 4a is a schematic isometric view of a solid integrating optic 412, which can be used like solid integrating optics 312 and 112 in light source modules 310 and 110 and other light source modules. FIG. 4b is a schematic front view of solid integrating optic 412 along the direction indicated by vector V in FIG. 4a. Solid integrating optic 412 has an entrance face 416 and exit face 417. As illustrated, entrance face 416 has an entrance face surface area smaller than an exit face surface area of exit face 417. In other embodiments, the shapes of the faces 416, 417 may be the same, and/or the entrance face surface area and exit face surface areas may be equal. In still other embodiments, the entrance face surface area may be greater than the exit face surface area. In the embodiment illustrated, exit face 417 has a shape appropriate for matching an illumination target shape such as a 16:9 format video imager. When the faces 416, 417 have surface areas that are not equal, the solid integrating optic 412 may taper between the entrance face and the exit face.

The solid integrating optic 312 of FIG. 3 has one or more side surfaces 318 connecting the entrance face 316 and exit face 317. Typically, a solid integrating optic has four side surfaces, such as side surfaces 418 of the solid integrating optic 412 of FIGS. 4a and 4b. As illustrated in FIG. 4a, each of the side surfaces 418 is planar, although in other embodiments, side surfaces can take non-planar shapes. One or more side surfaces of the solid integrating optics herein can have reflective coatings or layers, for example, of aluminum, silver, other metals, reflective dielectrics, dielectric stacks, combinations thereof, or any other suitable reflectors. A side surface can be coated over its entire area, or it may be left uncoated, or it may be partially coated. When light is incident upon an uncoated portion of a side surface, Fresnel reflections, such as total internal reflections, can contribute to the functioning of the solid integrating optic. A solid integrating optic can be made of any suitable transparent material, which will generally be characterized by an index of refraction. Materials that may be suitable include: glass, acrylic, other optical plastics, solid encapsulants, and encapsulant gels.

A solid integrating optic can transport or deliver light from its entrance face to its exit face and in so doing, enhance the spatial uniformity of light emerging from the exit face relative to the initial spatial uniformity of light incident upon the entrance face. The light incident upon the entrance face may be non-uniform for a number of reasons. The light emitted from the light emitting surface 214 of an emitter 211 of FIG. 2, for example, may vary with different colors of light being emitted from the different light emitting areas 215. The light emitting areas 215 may emit different colors simultaneously, or they may vary their light emission over time to provide, for example, a color-sequential light source. In one embodiment, the light emitting areas 215 emit a mixture of red, green, and blue light, that, when homogenized by a solid integrating optic, can result in a white light. In other embodiments, one or more single color light emitting areas 215 illuminate concurrently to provide a highly spatially non-uniform light at the entrance face of a solid integrating optic, which, after propagation through the optic, can result in a substantially uniform light at the exit face. In another embodiment, an emitter such as emitter 111 of FIG. 1 has a single light emitting area that is spatially non-uniform owing to the physical nature of the emitter. For example, an LED emitter may have die lines, conductive traces or leads, and/or other variations in structure that result in spatial non-uniformity. A solid integrating optic can homogenize light passing through it so that the light is suitably uniform for illumination of an illumination target.

The geometry and dimensions of an integrating optic can influence the degree to which light passing through is homogenized. An optical designer may, for example, select a length l of a solid integrating optic, as shown in FIG. 3, to result in a desired uniformity of delivered light. The present inventors have found, for example, that an approximately 5 mm long solid integrating optic can provide sufficient uniformity when starting with a light emitting surface measuring $(1.4 \text{ mm})^2$ having four red-green-blue-green emitting areas arranged in a Bayer pattern, similar to that shown in FIG. 2. A more uniform emitter, such as a monochrome emitter, of the same size only required an approximately 2 mm long integrating optic in tests. Integrating optics are further described in, for example, U.S. Pat. No. 5,625,738 (Magarill).

The spatial uniformity of light at the exit face of an integrating optic as disclosed herein allows for the possibility of designing an illumination system such that the exit face of an integrating optic is imaged by the system onto the illumination target, while maintaining suitable spatial uniformity of illumination. In contrast, illumination systems without an integrating optic may employ defocusing of illumination light to prevent imaging spatial non-uniformities onto an illumination target, leading to lower efficiency. A system with an integrating optic may provide higher efficiency than one without.

Lens 113 of FIG. 1 or lens 313 of FIG. 3 can be any suitable lens or system of lenses chosen to achieve a particular result. For example, lens 113, 313 can include a converging lens to aid in the production of collimated, or less divergent, light from light source modules 110 or 310. In light source module 310, which serves as a model for any like light source module, such as light source module 110, lens 313 may be attached, bonded, adhered, or otherwise located proximal to solid integrating optic 312 and aligned to receive light from the exit face 317 of the integrating optic. The surface of the lens 313 proximal to the exit face 317 of the solid integrating optic may generally conform to the shape of the exit face over the entire area of the exit face, which may be planar or non-planar. The lens 313 can have a symmetry axis, and the symmetry axis of the lens can be aligned with a symmetry axis of the solid integrating optic 312. A filter, such as a reflective polarizer, can be disposed between the solid integrating optic 312 and lens 313, and the combination of integrating optic, filter, and lens may be bonded with any compatible material, such as an adhesive. Any suitable type of reflective polarizer may be used, e.g., multilayer optical film reflective polarizers; diffusely reflective polarizing film, such as continuous/disperse phase polarizers; wire grid reflective polarizers; or cholesteric reflective polarizers. Lens 313 may be made of any suitable transparent material, which will generally be characterized by an index of refraction. Materials that may be suitable include high index glasses such as S-LAH-79 from Ohara Glass (Sagamihara, Japan) or LASF-35 from Schott Glass (Mainz, Germany).

Lens 313 can be substantially hemispherical. In one embodiment, lens 313 is precisely hemispherical, to a degree that is practical to manufacture. In other embodiments, lens 313 varies from a precisely hemispherical figure but may still be considered substantially hemispherical. The curved surface of lens 313 may be aspherical, as understood by those of skill in the art, such that its figure deviates from a precisely spherical shape, for example, to incorporate refractive corrections for spherical aberrations and other aberrations. Whether precisely or substantially hemispherical in shape, lens 313 has a radius R. For a lens 313 that is not precisely hemispherical, R can be defined by the fit parameters obtained when performing a best fit of the outer surface of the lens to a precisely spherical surface. The outer surface of the lens is the curved surface farthest from the solid integrating optic 312.

Figure 5:
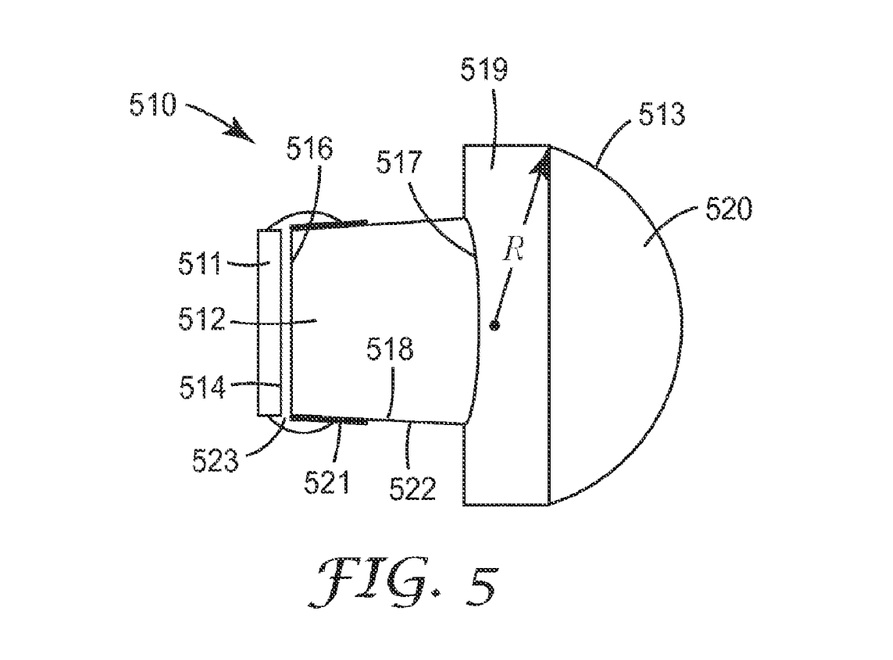
FIG. 5 is a schematic cross-sectional view of another light source module.

FIG. 5 is a schematic cross-sectional view of another light source module 510, which may be suitable for use in a projection system 100 or any other compatible illumination system. Light source module 510 of FIG. 5 exemplifies some variations in light source module design compared to, for example, light source module 310 of FIG. 3. The dimensions and proportions of solid integrating optic 512, for example, generally differ from those of solid integrating optic 312. The lens 513 shown in FIG. 5 includes two geometrical shapes: a substantially hemispherical portion 520 and a cylindrical portion 519. These two sub-shapes of lens 513 can be continuously formed of one material. As schematically illustrated, substantially hemispherical portion 520 forms somewhat less than a hemisphere, yet is still substantially hemispherical. In other embodiments, a substantially hemispherical portion of a lens can form somewhat more than a hemisphere. Solid integrating optic 512 of FIG. 5 is illustrated with a non-planar exit face 517, to which the proximal surface of the lens 513 can conform.

FIG. 5 further illustrates additional design variations for light source modules. Light source module 510 includes reflective coatings or layers over portions 521 of side surfaces 518, while other portions 522 are uncoated. As shown in FIG. 5, the portions 521 of the side surfaces adjacent the entrance face have reflective coatings or layers, while the portions 522 adjacent the exit face are uncoated. Such a design choice may be made, for example, if it is known or believed that total internal reflection (TIR) may be more effective at portions 522, but less effective at portions 521. FIG. 5 schematically illustrates one potential cause for such a differentiation in effectiveness of TIR. Light source module 510 includes an encapsulant 523 that optically couples emitter 511 to solid integrating optic 512. As illustrated, encapsulant 523 may not be confined to the space between the light emitting surface 514 and the entrance face 516, and it may contact one or more side surfaces 518 of the solid integrating optic 512, where it might optically couple light out of the optic if the side surface 518 were uncoated and only to rely on TIR to contain light. The presence of a reflective coating or layer at a portion 521 of a side surface 518 may prevent such undesired loss of light from the solid integrating optic 512. As described herein, other light source modules may include solid integrating optics having side surfaces with reflective layers or coatings over substantially their entire areas.

Figure 6A:
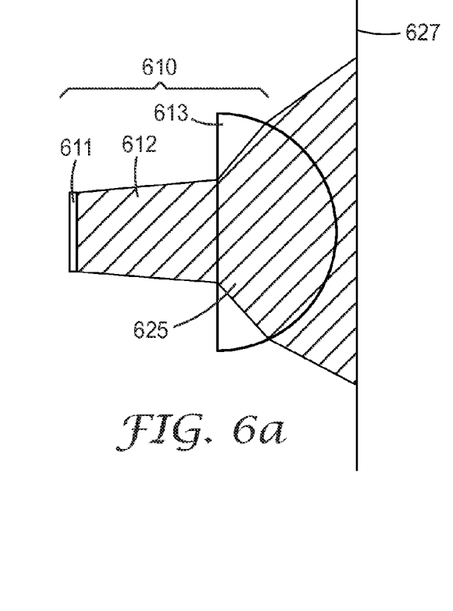
FIG. 6a is a schematic illustration of light passing from a solid integrating optic to a lens having the same index of refraction.
Figure 6B:
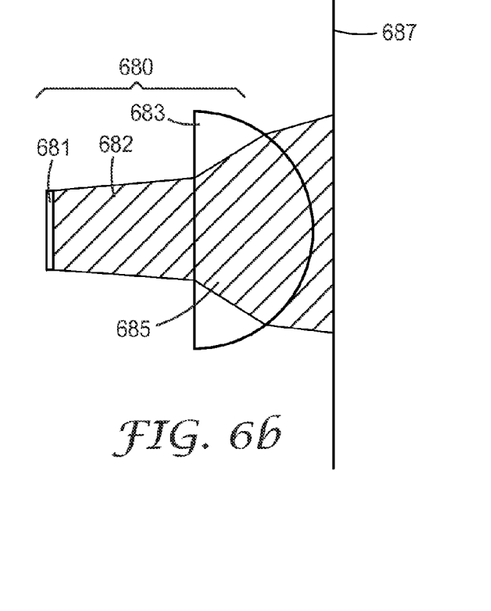
FIG. 6b is a schematic illustration of light passing from a solid integrating optic to a lens having a higher index of refraction.

Light source modules 110, 310, 510 each include a solid integrating optic 112, 312, 512 and a lens 113, 313, 513. Each of these solid integrating optics and lenses can be characterized by an index of refraction of the material of which it is formed. Differences in index between media generally result in refraction for light passing between the media. FIGS. 6a and 6b are schematic illustrations of this effect for light passing from solid integrating optics 612, 682 to lenses 613, 683, respectively, based upon a ray-tracing simulation of light source modules 610 and 680. The effect illustrated in FIGS. 6a and 6b applies to light source modules 110, 310, 510, and other analogous light source modules as well. The hatched areas 625, 685 represent the volumes of space occupied by light propagating from emitters 611, 681 as the light propagates through the solid integrating optics 612, 682 and lenses 613, 683 and out of the light source modules onto planes 627, 687. In FIG. 6a, the solid integrating optic 612 and lens 613 have the same index of refraction. In FIG. 6b, the lens 683 has a higher index of refraction relative to the solid integrating optic 682. Owing, at least in part, to refraction at the interface between the optic 682 and lens 683, light exits light source module 680 in a narrower, or smaller, cone as compared to light exiting light source module 610. When projected upon planes 627, 687 equidistant from modules 610 and 680, the light exiting light source module 680 illuminates a smaller area than the light exiting light source module 610. The narrower illumination cone and smaller area size characteristic of light source module 680 can enable a more compact illumination system.

In some embodiments, the light source module includes a lens having an index of refraction of at least 1.8 or at least 2.0. In further embodiments, the light source module includes a lens having an index of refraction not greater than 2.6. Furthermore, a light source module may include a lens having an index of refraction in a range combining any of the aforementioned endpoints.

In some embodiments, the light source module includes a solid integrating optic having an index of refraction not greater than 1.7 or not greater than 1.5. In further embodiments, the light source module includes a solid integrating optic having an index of refraction of at least 1.3. Furthermore, a light source module may include a solid integrating optic having an index of refraction in a range combining any of the aforementioned endpoints.

In some embodiments, the ratio of the lens index of refraction to the solid integrating optic index of refraction may be at least 1.05 or at least 1.3. In further embodiments, the ratio of the lens index of refraction to the solid integrating optic index of refraction may be 1.5. In some embodiments, the ratio of the lens index of refraction to the solid integrating optic index of refraction may be not greater than 2.0. Furthermore, the ratio of the lens index of refraction to the solid integrating optic index of refraction may be in a range combining any of the aforementioned endpoints.

The consideration of refractive indices may be extended to other components of a light source module, such as an encapsulant that may be disposed between a light emitting surface and an entrance face of a solid integrating optic. An encapsulant can act to optically couple or bond elements of the light source module. The refractive effect discussed herein with regard to the indices of refraction of solid integrating optics and lenses may be approximately summarized by saying that the angular extent, or cone, of light propagation narrows when crossing an interface from low index to high index. Accordingly, in light source modules of the present disclosure, an encapsulant may be used having an index of refraction less than that of the lens. Furthermore, the encapsulant index of refraction may be equal to or less than that of the solid integrating optic.

FIGS. 6a and 6b are also useful in illustrating another aspect of lenses useful for light source modules. The hatched areas 625, 685 denote the portions of the volumes of the solid integrating optics 612, 682 and lenses 613, 683 where illumination light can be present. The portions of the interior volumes of the lenses 613, 683 that are not hatched, and where illumination light generally will not be present, represent material that may be removed from the lenses without substantially affecting their optical function. In this regard, lenses with such removed or missing material are functionally the same as lenses from which the extraneous material has not been removed, in so far as both types of lenses perform the same optical functions, and are therefore well within the scope of the present disclosure. For example, lens 683 might be described as substantially hemispherical, even if the portion of material that light does not pass through were removed or otherwise missing.

Figure 7:
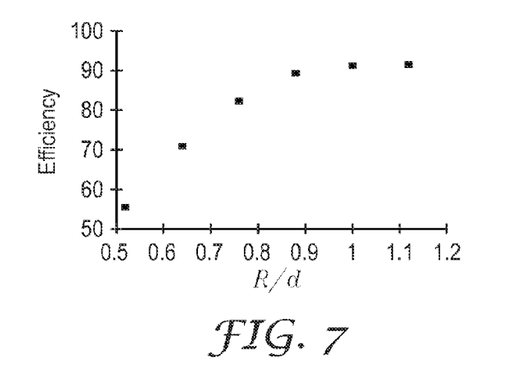
FIG. 7 is a plot of Efficiency vs. R/d.

Along with compactness and other attributes, efficiency can be an important design consideration for illumination systems. Efficiency may be quantified in terms of luminous flux brought to bear on an illumination target, as compared to an initial flux of light from an emitter coupled into the solid integrating optic. In light source modules of the present disclosure, it has been found that the ratio of the radius of the lens R to the exit face diagonal of the solid integrating optic (d in FIG. 4a) can affect the efficiency of the light source module. A computational simulation was performed to study the efficiency of light source modules as the ratio of R to d is varied. Calculations assumed an appropriate antireflection coating on the lens, Fresnel losses at interfaces between media, and an enhanced silver reflective coating on all side surfaces of the solid integrating optic. Data from this simulation are presented in FIG. 7, which is a plot of Efficiency vs. R/d. We observed a significant gain in efficiency as R/d approaches unity, after which efficiency gains level off. Without wishing to be bound by theory and by way of explanation only, the inventors believe that one reason for this gain in efficiency as the radius of the lens grows larger relative to the integration optic exit face is that as the ratio increases, illumination light rays are incident upon the outer surface of the lens at angles closer to normal, resulting in lower Fresnel losses, as compared to light rays incident at more oblique or glancing angles. R/d ratios of greater than 0.7, 0.8, 0.9, 1, 1.1, or 1.2 can contribute to efficiency of a light source module. In some embodiments, the R/d ratio does not exceed 1.2.

Another tactic for enhancing efficiency is to employ antireflection coatings on any surfaces where it may be appropriate. Any suitable antireflection coatings or layers may be used in illumination systems as disclosed herein. In general, antireflection coatings may be employed at any interface where light propagates between media having different indices of refraction. In addition to media/air interfaces, antireflection coatings may be used, for example, at the interface between the exit face of the solid integrating optic and the lens, or between the light emitting surface of the emitter and the entrance face of the solid integrating optic.

What is claimed is:

1. A light source module, comprising:
    an emitter comprising a light emitting surface;
    a solid integrating optic aligned to accept light emitted from the emitter at an entrance face and deliver light to an exit face, wherein the exit face has an exit face surface area and an exit face diagonal; and
    a lens aligned to receive light from the exit face of the solid integrating optic, the lens comprising a substantially hemispherical portion having a radius of curvature;
    wherein
        the ratio of the radius of curvature to the exit face diagonal is greater than 0.7; and
        the solid integrating optic has a solid integrating optic index of refraction, the lens has a lens index of refraction, and the ratio of the lens index of refraction to the solid integrating optic index of refraction is greater than unity.

2. The light source module of claim 1, wherein the ratio of the lens index of refraction to the solid integrating optic index of refraction is at least 1.3.

3. The light source module of claim 1, wherein the solid integrating optic index of refraction is no greater than 1.7.

4. The light source module of claim 1, wherein the lens index of refraction is at least 1.8.

5. The light source module of claim 1, wherein the lens further comprises a cylindrical portion.

6. The light source module of claim 1, wherein the substantially hemispherical portion of the lens is aspheric.

7. The light source module of claim 1, wherein the light emitting surface comprises an array comprising a plurality of light emitting areas.

8. The light source module of claim 1, wherein the entrance face has dimensions and shape substantially matching dimensions and shape of the light emitting surface.

9. The light source module of claim 1, wherein the exit face has a shape approximately the same as an imager shape.

10. The light source module of claim 1, wherein the entrance face has an entrance face surface area smaller than the exit face surface area.

11. The light source module of claim 1, further comprising an encapsulant disposed between the light emitting surface and the solid integrating optic.

12. The light source module of claim 11, wherein the encapsulant has an encapsulant index of refraction less than the lens index of refraction.

13. The light source module of claim 12, wherein the encapsulant index of refraction is not greater than the solid integrating optic index of refraction.

14. The light source module of claim 1, further comprising a reflective polarizer disposed between the light emitting surface and the entrance face.

15. The light source module of claim 14, wherein the light emitting surface, reflective polarizer, and entrance face are bonded.

16. The light source module of claim 1, further comprising a reflective polarizer disposed between the exit face and the lens.

17. The light source module of claim 16, wherein the exit face, reflective polarizer, and lens are bonded.

18. The light source module of claim 1, wherein the solid integrating optic has at least one side surface having a reflective coating on at least part of the side surface.

19. The light source module of claim 1, further comprising an antireflection coating disposed between the exit face and the lens.

20. A projection system, comprising:
    at least one light source module, comprising:
        an emitter comprising a light emitting surface;
        a solid integrating optic aligned to accept an illumination light emitted from the emitter at an entrance face and deliver the illumination light to an exit face, wherein the exit face has an exit face diagonal; and
        a lens aligned to receive the illumination light from the exit face of the solid integrating optic, the lens comprising a substantially hemispherical portion having a radius of curvature, the lens conforming to the exit face over substantially the entire exit face surface area;
        wherein
            the ratio of the radius of curvature to the exit face diagonal is greater than 0.7; and
            the solid integrating optic has a solid integrating optic index of refraction, the lens has a lens index of refraction, and the ratio of the lens index of refraction to the solid integrating optic index of refraction is greater than unity;
    an imager;
    optical elements arranged to deliver the illumination light from the at least one light source module to the imager; and
    a projection lens arranged to receive an image light from the imager and project the image light.

* * * * *